US012333640B2

United States Patent
Jordan et al.

(10) Patent No.: US 12,333,640 B2
(45) Date of Patent: Jun. 17, 2025

(54) FACIAL ACTIVITY DETECTION FOR VIRTUAL REALITY SYSTEMS AND METHODS

(71) Applicant: Universal City Studios LLC, Universal City, CA (US)

(72) Inventors: Robert Michael Jordan, Orlando, FL (US); Mark James Traynor, Orlando, FL (US); Patrick John Goergen, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 132 days.

(21) Appl. No.: 18/092,728

(22) Filed: Jan. 3, 2023

(65) Prior Publication Data

US 2023/0215070 A1    Jul. 6, 2023

Related U.S. Application Data

(60) Provisional application No. 63/296,363, filed on Jan. 4, 2022.

(51) Int. Cl.
*G06T 13/40*    (2011.01)
*A63G 31/16*    (2006.01)
(Continued)

(52) U.S. Cl.
CPC .............. *G06T 13/40* (2013.01); *A63G 31/16* (2013.01); *G06T 13/205* (2013.01);
(Continued)

(58) Field of Classification Search
CPC ..... G06T 13/40; G06T 13/205; G06T 19/006; A63G 31/16; G06V 40/171; G06V 40/20;
(Continued)

(56) References Cited

U.S. PATENT DOCUMENTS 10,565,790 B2   2/2020  Kaehler
2009/0202114 A1*  8/2009  Morin ..................... A63F 13/12
                                                           382/118

(Continued)

OTHER PUBLICATIONS

PCT/US2023/010129 International Search Report and Written Opinion mailed Apr. 11, 2023.

(Continued)

*Primary Examiner* — Jitesh Patel
(74) *Attorney, Agent, or Firm* — Fletcher Yoder, P.C.

(57) ABSTRACT

In an embodiment, a virtual reality ride system includes a display to present virtual reality image content to a first rider, an audio sensor to capture audio data associated with a second rider, and an image sensor to capture image data associated with the second rider. The virtual reality ride system also includes at least one processor communicatively coupled to the display and configured to (i) receive the audio data, the image data, or both, (ii) generate a virtual avatar corresponding to the second rider, wherein the virtual avatar includes a set of facial features, (iii) update the set of facial features based on the audio data, the image data, or both, and (iv) instruct the display to present the virtual reality image content including the virtual avatar and the updated set of facial features.

24 Claims, 4 Drawing Sheets

(51) Int. Cl.
  *G06T 13/20* (2011.01)
  *G06T 19/00* (2011.01)
  *G06V 40/16* (2022.01)
  *G06V 40/20* (2022.01)
(52) U.S. Cl.
  CPC .......... *G06T 19/006* (2013.01); *G06V 40/171*
   (2022.01); *G06V 40/20* (2022.01)
(58) Field of Classification Search
  CPC .... G06V 20/20; G06V 40/165; G06V 40/176;
   G10L 2015/025; G10L 2021/105
  See application file for complete search history.

(56) References Cited

U.S. PATENT DOCUMENTS

| | | | | |
|---|---|---|---|---|
| 2009/0231347 | A1* | 9/2009 | Omote | G06T 13/205 345/473 |
| 2011/0174189 | A1* | 7/2011 | Beutler | A63G 7/00 348/222.1 |
| 2011/0304629 | A1* | 12/2011 | Winchester | G06T 13/40 345/473 |
| 2015/0269780 | A1* | 9/2015 | Herman | G06T 19/006 345/633 |
| 2017/0243387 | A1 | 8/2017 | Li et al. | |
| 2018/0255285 | A1 | 9/2018 | Hall et al. | |
| 2018/0284881 | A1* | 10/2018 | Briggs | A63G 33/00 |
| 2019/0099675 | A1* | 4/2019 | Khan | A63F 13/211 |
| 2019/0197755 | A1* | 6/2019 | Vats | G06T 13/40 |
| 2020/0223352 | A1* | 7/2020 | Toshio Kimura | B60Q 1/547 |

OTHER PUBLICATIONS

Doenges et al., "MPEG-4; Audio/Video & Synthetic Graphics/Audio for Real-Time, interactive Media Delivery," Oct. 22, 1996, XP002242943, URL:www.dsp.dist.unige.it/snhc/articles/icjdraft.html, retrieved on May 30, 2003.

* cited by examiner

FACIAL ACTIVITY DETECTION FOR VIRTUAL REALITY SYSTEMS AND METHODS

CROSS REFERENCE TO RELATED APPLICATIONS

This application claims priority from and the benefit of U.S. Provisional Application Ser. No. 63/296,363, entitled "FACIAL ACTIVITY DETECTION FOR VIRTUAL REALITY SYSTEMS AND METHODS", filed Jan. 4, 2022, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The present disclosure generally relates to virtual reality systems and, more particularly, to virtual reality (VR) systems implemented and/or operated incorporating facial activity detection to facilitate providing a more immersive user experience.

Amusement parks often contain attractions or experiences that use virtual reality systems to provide enjoyment and entertain guests of the amusement parks. For example, the attractions may include themed environments established using display devices presenting media content (e.g., in the form of video, text, still imagery, motion graphics, or a combination thereof). For some attractions, it may be desirable to display media content with special visual effects to create a realistic and/or immersive viewing or playing experience for guests. To facilitate providing a more realistic and/or immersive experience, attractions may be implemented and/or operated to present virtual reality content to guests.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a virtual reality ride system includes a display to present virtual reality image content to a first rider, an audio sensor to capture audio data associated with a second rider, and an image sensor to capture image data associated with the second rider. The virtual reality ride system also includes at least one processor communicatively coupled to the display and configured to receive the audio data, the image data, or both. The at least one processor is also configured to generate a virtual avatar corresponding to the second rider, wherein the virtual avatar includes a set of facial features. The at least one processor is also configured to update the set of facial features based on the audio data, the image data, or both and instruct the display to present the virtual reality image content including the virtual avatar and the updated set of facial features.

In an embodiment, a virtual reality device includes an audio sensor to capture audio data indicative of speech of a user and an image sensor to capture image data indicative of facial characteristics of the user. The virtual reality device also includes at least one processor communicatively coupled to the audio sensor, and the image sensor. The at least one processor determines a set of facial characteristics based on the image data, determines a set of facial movements associated with the set of facial characteristics based on the audio data, and transmits the set of facial characteristics and the set of facial movements to a second virtual reality device, the second virtual reality device configured to display virtual reality image content based on the set of facial characteristics and the set of facial movements.

In an embodiment, a method includes receiving audio data, image data, or both, generating a virtual avatar based on the image data, the virtual avatar including a set of facial features, and determining a set of facial characteristics associated with the image data. The method also includes comparing the set of facial characteristics with a set of facial gesture profiles, each facial gesture profile of the set of facial gesture profiles including a corresponding set of stored facial characteristics. The method also includes selecting, based on the comparison, a facial gesture profile of the set of facial gesture profiles, animating the set of facial features based on the selected facial gesture profile, the audio data, or both, and presenting virtual reality image content including the virtual avatar and the animated set of facial features.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
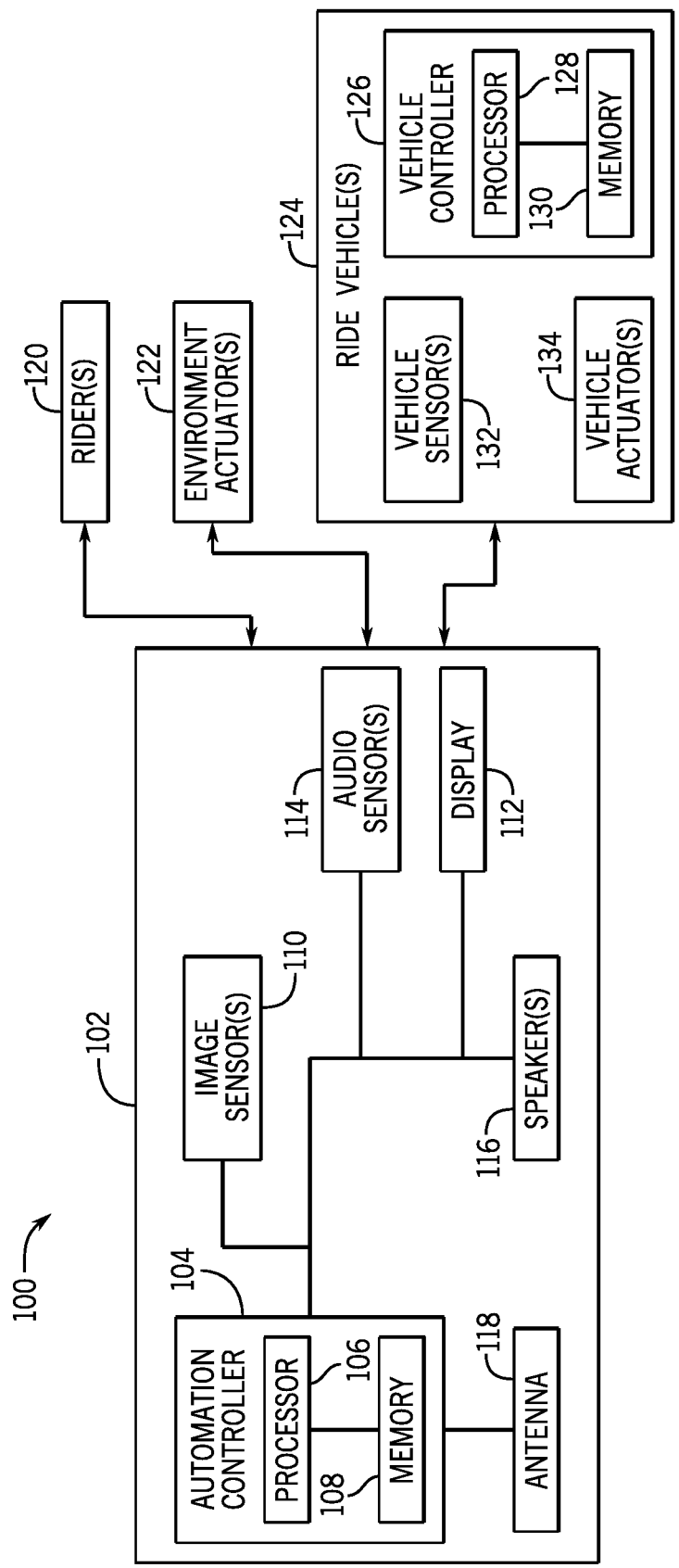
FIG. 1 is a block diagram of a virtual reality ride system including a virtual reality device, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. As used herein, "viseme" refers to a shape and/or configuration of facial features such as the mouth, lips, and/or tongue when making a corresponding sound. As used herein, "phoneme" refers to a distinct unit of sound in spoken language that facilitates distinguishing between different spoken words.

The present disclosure relates generally to virtual reality systems. More particularly, the present disclosure relates to virtual reality systems incorporating facial activity detection to facilitate providing a more immersive user experience. Amusement parks often contain attractions or experiences that use virtual reality systems to provide enjoyment and entertain guests of the amusement parks. The attractions may include any type of ride system that is designed to entertain a passenger, such as an attraction that includes a ride vehicle that travels along a path, an attraction that includes a room or theatre with stationary or moving seats for passengers to sit in while the passengers watch a video, an attraction that includes a pathway for guests to travel along, a room for guests to explore, or the like. For some attractions, it may be desirable to display media content with special visual effects to create a realistic and/or immersive viewing or playing experience for guests. Additionally, while the disclosed embodiments generally discuss virtual reality systems that are used for entertainment purposes, the disclosed embodiments may also apply to virtual reality systems that are used for any other suitable purpose.

In some instances, a rider on a virtual reality ride system may experience virtual reality image content that fails to resemble the surroundings (e.g., other riders, weather conditions, landscape, and so forth), which affects (e.g., reduces and/or degrades) the ride experience, when virtual reality image content does not match the rider's expected view. For example, when the rider turns their head toward another rider on the virtual reality ride system, the rider may expect to see the other rider depicted in the virtual reality display (e.g., head-mounted display). However, the virtual reality image content presented on the display may not match the other rider's physical characteristics, gestures, facial features, and so forth. As such, a mismatch between the rider's expected view and the virtual reality image content may affect the ride experience.

To facilitate reducing mismatch of a rider's expected view and the virtual reality image content, in some instances, a virtual reality ride system may generate virtual reality image content based at least in part on characteristics of other riders and/or guests and/or based at least in part on characteristics of physical (e.g., actual and/or real) movement of a ride vehicle, and thus, a rider carried by the vehicle.

As described above, to facilitate reducing mismatch between the rider's expected view and the virtual reality image content, a virtual reality ride system may present virtual reality image content to a rider of a ride vehicle such that virtual reality image content is coordinated with physical (e.g., real and/or actual) characteristics of other riders. For example, to display other riders of the virtual reality ride system and/or other guests, the virtual reality ride system may generate and display virtual reality image content that includes virtual avatars with similar facial characteristics (e.g., mouth, nose, eyes, and so forth), similar facial movement (e.g., open mouth, raised eyebrows, furrowed brow, and so forth), similar facial gestures (e.g., smile, frown, excitement, and so forth) and that results in visually perceived images occurring at approximately the same time and for approximately the same duration. As used herein, virtual avatar refers to a graphical representation (e.g., a virtual representation) of a character (e.g., a rider of a virtual reality ride system and/or a guest of an amusement park attraction or experience) in a graphical environment (e.g., a virtual reality environment, a mixed reality environment, an augmented reality environment, and so forth).

To facilitate coordinating presentation of virtual reality content with physical characteristics and/or movement of other riders and/or guests, a virtual reality ride system may include one or more image sensors. For example, a rider may view a display (e.g., a head-mounted display) that includes a camera facing the rider that is implemented and/or operated to sense (e.g., capture images) physical characteristics of the rider, such as facial features, facial movement, facial gestures, movement of limbs, and so forth. As such, in some embodiments, a virtual reality ride system may coordinate presentation of virtual reality image content with physical characteristics of the rider to other riders and/or guests at approximately the same time as image data indicative of the physical characteristics is determined (e.g., sensed and/or captured).

Typically, a rider on a virtual reality ride system may speak to another rider. In some instances, an avatar of a rider speaking in the virtual reality image content may fail to resemble a speaking character, which affects (e.g., reduces and/or degrades) the ride experience, when the virtual reality image content does not match the rider's expected view. To facilitate reducing the mismatch based on rider's speaking to one another, a virtual reality ride system may generate virtual reality image content based at least in part on captured speech of riders and/or guests. For example, the virtual reality ride system may generate and provide audio content that corresponds to captured speech of riders and may generate and display virtual reality image content that includes virtual avatars with similar mouth movement to speaking riders that results in visually perceived images occurring at approximately the same time and for approximately the same duration.

To facilitate coordinating virtual reality image content with speech and corresponding facial movements of riders and/or guests, a virtual reality ride system may include one or more audio sensors (e.g., microphones). For example, a display (e.g., a head-mounted display) may include a microphone which is implemented and/or operated to sense (e.g., capture and/or detect) speech from a corresponding rider. Additionally, or alternatively, the virtual reality ride system may analyze the sensed speech to determine text based on the captured speech and/or to determine facial movements based on the captured speech and/or determined text. As such, in some embodiments, a virtual reality ride system may coordinate presentation of audio content and/or virtual reality image content with captured speech of riders at approximately the same time as audio data indicative of the speech being sensed (e.g., captured and/or detected.)

Generally, visual stimuli are perceived by a human's visual system. In fact, at least in some instances, changes in perceived visual stimuli over time may enable a human to detect motion (e.g., movement). For example, when a perceived visual stimuli is translated left over time, the human may perceive (e.g., determine and/or detect) that he/she is moving right relative to the perceived visual stimuli or vice versa. Additionally, or alternatively, when a perceived visual stimuli is translated upward over time, the human may perceive that he/she is moving downward relative to the perceived visual stimuli or vice versa.

Movement of a human may additionally or alternatively be perceived by the human's vestibular system (e.g., inner ear). In other words, at least in some instances, movement of a human may be perceived by the human's vestibular system as well as by the human's visual system. However, at least in some instances, a mismatch between the movement perceived by the human's vestibular system and the movement perceived by the human's visual system may result in the human experiencing motion sickness.

In other words, at least in some instances, a rider on a virtual reality ride system may experience motion sickness, which affects (e.g., reduces and/or degrades) the ride experience, when visually perceived movement does not match movement perceived by the rider's vestibular system. As described above, a ride vehicle may carry a rider through a ride environment of a virtual reality ride system and, thus, movement of the rider may be dependent at least in part on movement of the ride vehicle. Thus, to facilitate reducing likelihood of producing motion sickness, a virtual reality ride system may coordinate virtual reality content with physical ride vehicle movement. For example, the virtual reality ride system may display virtual reality image content that is expected to result in characteristics, such as magnitude, time, duration, and/or direction, of visually perceived movement matching corresponding characteristics of movement perceived by the rider's vestibular system.

To facilitate reducing likelihood of producing motion sickness, a virtual reality ride system may present virtual reality image content to a rider of a ride vehicle such that movement perceived from the virtual reality content is coordinated with physical (e.g., real and/or actual) movement of the ride vehicle. For example, to compensate for physical movement of a ride vehicle, the virtual reality ride system may generate and display virtual reality image content that results in visually perceived movement occurring at approximately the same time, for approximately the same duration, and/or in approximately the same direction as the physical movement of the ride vehicle. In fact, in some embodiments, the virtual reality ride system may generate movement-coordinated virtual reality content by adapting (e.g., adjusting) default virtual reality content, for example, which corresponds with a default (e.g., stationary and/or planned) ride vehicle movement profile.

To facilitate coordinating presentation of virtual reality content with physical movement of a ride vehicle, a virtual reality ride system may include one or more sensors, such as a vehicle sensor, a rider (e.g., head-mounted display) sensor, and/or an environment sensor. For example, a ride vehicle may include one or more vehicle sensors, such as a gyroscope and/or accelerometer, which are implemented and/or operated to sense (e.g., measure and/or determine) characteristics of ride vehicle movement, such as movement time, movement duration, movement direction (e.g., orientation), and/or movement magnitude (e.g., distance). As such, in some embodiments, a virtual reality ride system may coordinate presentation of virtual reality content with ride vehicle movement at least in part by presenting movement-coordinated virtual reality content at approximately the same time as sensor data indicative of occurrence of the ride vehicle movement is determined (e.g., sensed and/or measured).

However, at least in some instances, generation and/or presentation (e.g., display) of virtual reality content is generally non-instantaneous. In other words, at least in some such instances, reactively generating and/or presenting virtual reality content may result in presentation of virtual reality content being delayed relative to another rider's movement and/or corresponding ride vehicle movement. Merely as an illustrative non-limiting example, due to the non-instantaneous nature, reactively generating and/or presenting virtual reality image content may result in the virtual reality image content being displayed after the other rider's movement and/or corresponding ride vehicle movement has already occurred, which, at least in some instances, may result in a reduced and/or degraded rider experience.

Thus, to facilitate coordinating presentation of virtual reality content, in some embodiments, a virtual reality ride system may predict characteristics, such as movement time, movement duration, movement direction, and/or movement magnitude, of the ride vehicle movement and/or riders in the ride vehicle over a prediction horizon (e.g., subsequent period of time). In other words, in such embodiments, the virtual reality ride system may determine a predicted ride vehicle movement profile (e.g., trajectory) over the prediction horizon and/or a predicted rider movement profile (e.g., facial gesture, movement, and so forth) over the prediction horizon. For example, the predicted rider movement profile may indicate that a corresponding rider raises their arms from a first time to a second (e.g., subsequent) time, smiles from the second time to a third (e.g., subsequent) time, laughs from the third time to a fourth (e.g., subsequent) time, and so forth. As another example, the predicted ride vehicle movement profile may indicate that a corresponding ride vehicle moves a first distance (e.g., magnitude) in a first direction from a first time to a second (e.g., subsequent) time, a second distance in a second direction from the second time to a third (e.g., subsequent) time, and so on.

In this manner, the techniques described in the present disclosure may facilitate coordinating virtual reality image content based on physical characteristics of riders, the ride vehicle, and/or captured speech, which, at least in some instances, may facilitate improving the ride experience provided by the virtual reality ride system.

With the foregoing in mind, FIG. 1 illustrates an example of a virtual reality ride system 100 including a virtual reality device 102 (e.g., head-mounted display device), any number of environment actuators 122, and any number of ride vehicles 124. The virtual reality ride system 100 may be used to provide visual effects to a display 112 during an amusement park attraction and/or experience. In certain embodiments, the virtual reality device 102 may be provided in the form of a computing device, such as a head-mounted display device, programmable logic controller (PLC), a personal computer, a laptop, a tablet, a mobile device (e.g., a smart phone), a server, or any other suitable computing device. The virtual reality device 102 may control operation of any number of image sensors 110, any number of audio sensors 114, and the display 112 and may process data received from the image sensors 110, audio sensors 114, environment actuators 122, vehicle sensors 132, and/or vehicle actuators 134. The virtual reality device 102 may include the image sensors 110, the display 112, the audio sensors 114, the speakers 116, and an antenna 118. An automation controller 104 may be coupled to the image sensors 110, the audio sensors 114, the display 112, the antenna 118, the environment actuators 122, and/or the ride vehicles 124 by any suitable techniques for communicating data and control signals between the automation controller 104, the components of the virtual reality device 102, the environment actuators 122, and/or the ride vehicles 124, such as a wireless, optical, coaxial, or other suitable connection.

The virtual reality device 102 may include a control system having multiple controllers, such as the automation controller 104, each having at least one processor 106 and at least one memory 108. The virtual reality device 102 may represent a unified hardware component or an assembly of separate components integrated through communicative coupling (e.g., wired or wireless communications). It should be noted that, in some embodiments, the virtual reality device 102 may include additional illustrated components of the virtual reality ride system 100. For example, the virtual reality device 102 may include the vehicle sensors 132 and/or a vehicle controller 126 and may be operable to communicate with additional virtual reality devices. With respect to functional aspects of the virtual reality device 102, the automation controller 104 may use information from the image sensors 110, the audio sensors 114, the environment actuators 122, and/or the ride vehicles 124 to generate and/or update virtual reality image content and to control operation of the display 112 to present the virtual reality image content. Further, the virtual reality device 102 may include communication features (e.g., the antenna 118) that facilitate communication with other devices (e.g., external sensors, additional virtual reality devices 102) to provide additional data for use by the virtual reality device 102. For example, the virtual reality device 102 may operate to communicate with external cameras and/or audio sensors to facilitate image data and/or audio data capture for an amusement park attraction or experience, guest interaction, and so forth.

In some embodiments, the memory 108 may include one or more tangible, non-transitory, computer-readable media that store instructions executable by the processor 106 (representing one or more processors) and/or data to be processed by the processor 106. For example, the memory 108 may include random access memory (RAM), read only memory (ROM), rewritable non-volatile memory, such as flash memory, hard drives, optical discs, and/or the like. Additionally, the processor 106 may include one or more general purpose microprocessors, one or more application specific processors, one or more application specific integrated circuits (ASICs), one or more field programmable gate arrays (FPGAs), or any combination thereof. Further, the memory 108 may store sensor data and/or information obtained via the image sensors 110, the audio sensors 114, the environment actuators 122, and/or the ride vehicles 124, virtual reality image content data generated, transmitted, and/or displayed via the display 112, and/or algorithms utilized by the processor 106 to help control operations of components of the virtual reality ride system 100 based on the sensor data and/or virtual reality image content data. Additionally, the processor 106 may process the sensor data and/or information to generate virtual reality image content data for a virtual avatar for display on the display 112 or another display of another virtual reality device. In certain embodiments, the virtual reality device 102 may include additional elements not shown in FIG. 1, such as additional data acquisition and processing controls, additional sensors and displays, user interfaces, and so forth.

The image sensors 110 may be incorporated into the virtual reality device 102 and may be capable of capturing images and/or video of a rider 120. For example, the virtual reality device 102 may be a head-mounted display device worn on the head of the rider 120 and the image sensors 110 may capture any number of images of the rider 120. In certain embodiments, the image sensors 110 may capture facial features (e.g., eyes, nose, mouth, lips, chin, eyebrows, ears, and so forth) of the rider 120. The image sensors 110 may generate and/or may transmit image data corresponding to the captured images to the automation controller 104. The image sensors 110 may include any number of cameras, such as any number of video cameras, any number of depth cameras capable of determining depth and distance to facial features and/or between facial features, any number of infrared cameras, any number of digital cameras, and so forth. In certain embodiments, the image sensors 110 may process the image data before transmission to the automation controller 104. Alternatively, the image sensors 110 may transmit raw image data to the automation controller 104. In some embodiments, the image sensors 110 may be capable of tracking a gaze of the rider 120. For example, the image sensors 110 may determine a direction the rider 120 is looking.

In certain embodiments, the memory 108 may store facial gesture profiles associated with a number of facial gestures. For example, each facial gesture profile may correspond to a different facial gesture, such as smiling, blinking, frowning, yawning, and so forth. The automation controller 104 may compare the captured image data from the image sensors 110 to the stored facial gesture profiles and may determine the captured image data is similar (e.g., matches, within a similarity threshold) to a stored facial gesture profile. For example, the automation controller 104 may compare a position, an orientation, a movement, and/or a shape of any number of facial features depicted in the image data and may compare to the stored facial gesture profiles. As such, the automation controller 104 may determine a stored facial gesture profile that corresponds to captured images of the rider 120.

The display 112 may be capable of depicting image content (e.g., still image, video, visual effects) to be viewed by one or more riders 120 of the virtual reality ride system 100 and/or guests of an amusement park attraction and/or experience. In some embodiments, the display 112 may be a head-mounted display and may be placed or worn on the head of a rider 120 and the display 112 may be placed in front of either one or both eyes of a rider 120. In certain embodiments, the display 112 may be capable of depicting virtual reality image content including a virtual avatar (e.g., avatar) of other riders of the virtual reality ride system 100 and/or guests of the amusement park attraction and/or experience. Additionally, or alternatively, the virtual reality image content may include more than one virtual avatar and may depict image content associated with the amusement park attraction and/or experience. For example, an amusement park ride may appear to take place on horseback travelling through a forest, on a motorcycle travelling along the road, in a haunted house, and so forth.

The audio sensors 114 may also be incorporated into the virtual reality device 102 and may be capable of capturing speech and/or sounds of the rider 120. For example, the audio sensors 114 may include microphones and the audio sensors 114 may be positioned on the virtual reality device 102 adjacent/proximate the mouth of the rider 120 wearing the virtual reality device 102. The audio sensors 114 may generate and/or may transmit audio data corresponding to the captured speech and/or sounds to the automation controller 104. In certain embodiments, the audio sensors 114 may process the audio data before transmission to the automation controller 104. Alternatively, the audio sensors 114 may transmit raw audio data to the automation controller 104. In certain embodiments, the virtual reality device 102 may include any number of audio playback components, such as one or more speakers 116, to playback audio content associated with the virtual reality experience. For example, the speakers 116 may playback audio corresponding to sounds of a horse during a virtual horseback ride, sounds of a motorcycle during a virtual motorcycle ride, and so forth. Additionally, or alternatively, the speakers 116 may playback audio content based on received audio data from other virtual reality devices 102. For example, virtual reality devices 102 worn by other riders of the virtual reality ride system 100 may capture audio data associated with the other riders (e.g., speech, sounds, and so forth) via audio sensors 114, as described herein. The virtual reality devices 102 may transmit the captured audio data to any number of additional virtual reality devices 102 for playback of the captured audio data via the audio playback components.

The automation controller 104 may generate and/or update virtual reality image content based on the audio data. In certain embodiments, the automation controller 104 may determine any number of phonemes associated with the audio data. For example, the automation controller 104 may determine a sequence of phonemes based on captured speech of a rider 120 of the virtual reality ride system 100. The sequence of phonemes may include an order of phonemes (e.g., first to last) corresponding to when the sounds were made by the rider 120. The automation controller 104 may determine a corresponding sequence of visemes based on the sequence of visemes and/or the audio data. In some embodiments, the automation controller 104 may determine facial movements (e.g., position and/or shape of the mouth) based on the visemes and may alter the facial features of a virtual avatar corresponding to the rider 120 based on the visemes. Accordingly, the automation controller 104 may generate and/or update the virtual reality image content to display facial movements of the virtual avatar corresponding to the captured speech of the rider 120.

Additionally, or alternatively, the automation controller 104 may analyze the audio data using natural language processing to determine text associated with corresponding captured speech of the rider 120. The automation controller 104 may generate and/or update the virtual reality image content based on the determined text. For example, the automation controller 104 may generate and/or animate a rigged model of a virtual avatar based on the determined text. The rigged model may include a number of movable features, such as facial features, and the automation controller 104 may animate the movable features based on the captured audio data and/or the determined text.

The antenna 118 may transmit data to additional virtual reality devices 102 and/or receive data from the additional virtual reality devices 102 via, for example, a network or a direct connection. In some embodiments, the antenna 118 may receive image data corresponding to images of other riders 120 and/or audio data corresponding to speech and/or sounds of the other riders 120 from additional virtual reality devices 102. The antenna 118 may be communicatively coupled to the automation controller 104 and may transmit data received from other virtual reality devices 102 to the automation controller 104 for processing. Additionally, or alternatively, the antenna 118 may receive image data and/or audio data from the automation controller 104 and may transmit the image data and/or audio data to additional virtual reality devices 102. The antenna 118 may be representative of any of various communication devices (e.g., wired or wireless transmitters and/or receivers).

In some embodiments, the virtual reality ride system 100 may be deployed at an amusement park, a theme park, a carnival, a fair, and/or the like. Additionally, in some embodiments, the virtual reality ride system 100 may be a roller coaster ride system, a lazy river ride system, a log flume ride system, a boat ride system, or the like. However, it should be appreciated that the depicted example is merely intended to be illustrative and not limiting. For example, in other embodiments, the virtual reality device 102 may be fully included in one or more ride vehicles 124. Additionally, or alternatively, in other embodiments, any components of the virtual reality device 102 may be remote from the one or more ride vehicles 124 and/or the one or more riders 120. In any case, a ride vehicle 124 may generally be implemented and/or operated to carry (e.g., support) one or more riders 120 (e.g., users) through the ride environment of the virtual reality ride system 100. Accordingly, physical (e.g., actual and/or real) movement (e.g., motion) of a rider 120 in the ride environment may generally be dependent on physical movement of the ride vehicle 124 carrying the rider.

To facilitate controlling movement of the ride vehicle 124, the ride vehicle may include one or more vehicle actuators 134. For example, the vehicle actuators 134 may include pneumatics, hydraulics, an engine, a motor, and/or a brake that enables controlling movement speed of the ride vehicle 124. In other embodiments, the vehicle actuators 134 may include a steering wheel and/or a rudder that enables controlling movement direction of the ride vehicle 124. In some embodiments, the ride vehicle 124 may additionally or alternatively include one or more haptic vehicle actuators implemented and/or operated to present virtual reality tactile content. Additionally, or alternatively, one or more environment actuators 122 may be implemented and/or operated to move the ride vehicle 124. For example, the environment actuators 122 may include pneumatics, hydraulics, an engine, a motor, and/or a brake to move the ride vehicle 124 through a ride environment.

The ride vehicle 124 may also include one or more vehicle sensors 132 to detect (e.g., sense and/or measure) sensor data indicative of any number of movement characteristics of the ride vehicle 124, such as orientation of the ride vehicle 124, location of the ride vehicle 124, movement profile of the ride vehicle 124, speed of the ride vehicle 124, acceleration (e.g., accelerating or decelerating) of the ride vehicle 124, and so forth. For example, the ride vehicle 124 may include an accelerometer and/or a gyroscope to detect speed, acceleration, and/or orientation of the ride vehicle 124. The one or more vehicle sensors 132 may generate and/or transmit the sensor data to the vehicle controller 126 and/or the automation controller 104. For example, the vehicle controller 126 may receive the vehicle sensor data and may determine a current and/or past orientation of the ride vehicle 124, a current and/or past location of the ride vehicle 124, a current and/or past speed of the ride vehicle 124, a current and/or past acceleration of the ride vehicle 124, current and/or past movement characteristics of the ride vehicle 124, and so forth. In certain embodiments, the vehicle controller 126 may transmit the movement characteristics associated with the ride vehicle 124 to the automation controller 104. Additionally or alternatively, the vehicle controller 126 may generate and/or may transmit the vehicle sensor data to the automation controller 104 and the automation controller 104 may process the vehicle sensor data to determine the movement characteristics associated with the ride vehicle 124 based on the vehicle sensor data.

The automation controller 104 may generate and/or update the virtual reality image content based on the movement characteristics associated with the ride vehicle 124. In certain embodiments, the automation controller 104 may alter an orientation and/or a position of any number of virtual avatars (e.g., a virtual representation) corresponding to any number of riders of the virtual reality ride system 100 based on the movement characteristics. For example, the automation controller 104 may determine the ride vehicle 124 is decelerating. As such, the automation controller 104 may alter an orientation of a virtual avatar corresponding to a rider 120 to show the virtual avatar leaning forward due to the deceleration. Additionally, or alternatively, the automation controller 104 may generate and/or update facial poses and/or gestures based on the movement characteristics of the ride vehicle 124. In some embodiments, the automation controller 104 may determine predicted facial poses and/or gestures based on the movement characteristics of the ride vehicle 124. For example, the automation controller 104 may predict a surprised face (e.g., raised eyebrows, open mouth) based on acceleration of the ride vehicle 124 and may alter the facial pose of the virtual avatar accordingly to display the surprised face.

Additionally or alternatively, the virtual reality device 102 may also include one or more sensors to detect (e.g., sense and/or measure) sensor data indicative of any number of movement characteristics of the rider 120, such as orientation of the rider 120, a location of the rider 120, a pose of the rider 120, speed of the rider 120, acceleration of the rider 120, and so forth. For example, the virtual reality device 102 may include an accelerometer to detect the rider sensor data and may transmit the sensor data to the automation controller 104. The automation controller 104 may receive the rider sensor data and may determine a current and/or past orientation of the rider 120, a current and/or past location of the rider 120, a current and/or past pose of the rider 120, a current and/or past speed of the rider 120, a current and/or past acceleration of the rider 120, and so forth. Additionally, or alternatively, the automation controller 104 may generate and/or may transmit the rider sensor data and/or the determined movement characteristics to any number of additional virtual reality devices 102 associated with other riders of the virtual reality ride system 100. Additionally, or alternatively, the virtual reality device 102 may receive rider sensor data for any number of riders 120 of the virtual reality ride system 100.

The automation controller 104 may generate and/or update the virtual reality image content based on the movement characteristics associated with the rider 120. In certain embodiments, the automation controller 104 may alter an orientation and/or a position of the virtual avatar corresponding to a rider of the virtual reality ride system based on the movement characteristics. For example, the automation controller 104 may determine the rider turns their head. As such, the automation controller 104 may alter the orientation of the virtual avatar's head corresponding to the rider to show the virtual avatar turned in the same direction.

In certain embodiments, the automation controller 104 and/or the vehicle controller 126 may receive the vehicle sensor data and the rider sensor data and may determine relative movement characteristics of the rider 120 relative to the ride vehicle 124. For example, the automation controller and/or the vehicle controller 126 may determine the orientation of the rider 120 relative to the vehicle 124, the position of the rider 120 relative to the vehicle 124, the speed of the rider 120 relative to the vehicle 124, the acceleration of the rider 120 relative to the vehicle 124, and/or vice versa. In some embodiments, the virtual reality device 102 and/or the vehicle controller 126 may transmit the relative movement characteristics to any number of additional virtual reality devices 102 associated with other riders of the virtual reality ride system 100.

The automation controller 104 and/or the vehicle controller 126 may receive the vehicle sensor data indicative of a current and/or past movement profile of the ride vehicle 124 and may determine a predicted ride vehicle movement that is expected to occur during a subsequent time period. As used herein, a "predicted ride vehicle movement profile" of the ride vehicle 124 describes movement characteristics of the ride vehicle 124 that are predicted (e.g., expected) to occur during a time period. The predicted ride vehicle movement profile may include one or more ride vehicle movement times, one or more ride vehicle movement durations, one or more predicted ride vehicle movement directions, one or more predicted ride vehicle movement magnitudes, and so forth. The one or more ride vehicle movement times may be indicative of a predicted start time and/or a predicted stop time of a specific movement of the ride vehicle 124 during the time period. The one or more ride vehicle movement durations may be indicative of one or more durations over which a specific movement of the ride vehicle 124 is predicted to occur during the time period. The one or more predicted ride vehicle movement directions may be indicative of a movement direction of the ride vehicle 124 during a corresponding ride vehicle movement duration in the time period. The one or more predicted ride vehicle movement magnitudes may be indicative of a movement magnitude (e.g., distance) of the ride vehicle 124 that is predicted to occur at a corresponding ride vehicle movement time and/or during a corresponding predicted ride vehicle movement duration.

In certain embodiments, the automation controller 104 may generate and/or update the virtual reality image content based on the predicted ride vehicle movement profile associated with the ride vehicle 124. In certain embodiments, the automation controller 104 may alter a position and/or an orientation of any number of virtual avatars corresponding to any number of additional riders of the virtual reality ride system 100. Additionally, or alternatively, the automation controller 104 may generate and/or update facial poses and/or facial gestures for any number of virtual avatars based on the predicted ride vehicle movement profile associated with the ride vehicle 124.

The ride vehicle 124 may include a control system having multiple controllers, such as vehicle controller 126, each having at least one processor 128 and at least one memory 130. In certain embodiments, the vehicle controller 126 may be provided in the form of a computing device, such as a programmable logic controller (PLC), a personal computer, a laptop, a tablet, a mobile device (e.g., a smart phone), a server, or any other suitable computing device. The vehicle controller 126 may control operation of any number of vehicle sensors 132, any number of vehicle actuators 134, and/or any number of environment actuators 122 and may process sensor data received from the vehicle sensors 132, the vehicle actuators 134, and/or the environment actuators 122. The vehicle controller 126 may be coupled to the vehicle sensors 132, the vehicle actuators 134, and/or the environment actuators 122 by any suitable techniques for communicating data and control signals between the vehicle controller 126, the components of the ride vehicles 124, and/or the environment actuators 122, such as a wireless, optical, coaxial, or other suitable connection.

The vehicle controller 126 may represent a unified hardware component or an assembly of separate components integrated through communicative coupling (e.g., wired or wireless communications). It should be noted that, in some embodiments, the vehicle controller 126 may include additional illustrated components of the virtual reality ride system 100. For example, the vehicle controller 126 may include the environment actuators 122 and may be operable to communicate with additional virtual reality devices 102. With respect to functional aspects of the ride vehicle 124, the vehicle controller 126 may use information from the environment actuators 122, the vehicle sensors 132, and/or the vehicle actuators 134 to generate and/or transmit vehicle sensor data and/or environment sensor data to one or more virtual reality devices 102.

In some embodiments, the memory 130 may include one or more tangible, non-transitory, computer-readable media that store instructions executable by the processor 128 (representing one or more processors) and/or data to be processed by the processor 128. For example, the memory 130 may include random access memory (RAM), read only memory (ROM), rewritable non-volatile memory, such as flash memory, hard drives, optical discs, and/or the like. Additionally, the processor 128 may include one or more general purpose microprocessors, one or more application specific processors, one or more application specific integrated circuits (ASICs), one or more field programmable gate arrays (FPGAs), or any combination thereof. Further, the memory 130 may store vehicle sensor data and/or environment sensor data obtained via the environment actuators 122, the vehicle sensors 132, and/or the vehicle actuators 134 and/or algorithms utilized by the processor 128 to help control operations of components of the ride vehicles 124 based on the vehicle sensor data and/or environment sensor data. Additionally, the processor 128 may process the vehicle sensor data and/or environment sensor data. In certain embodiments, the ride vehicle 124 may include additional elements not shown in FIG. 1, such as additional data acquisition and processing controls, additional sensors and displays, user interfaces, and so forth.

In certain embodiments, the virtual reality system 100 may include any number of virtual reality devices 102. For example, each rider 120 may be provided with a corresponding virtual reality device 102. Each virtual reality device 102 may capture image data and/or audio data associated with a corresponding rider 120. For example, the image sensors 110 may face or point towards a face of the corresponding rider 120 and may capture image data associated with facial characteristics and/or facial movements of the corresponding rider 120. Additionally, or alternatively, the audio sensors 114 may capture audio data corresponding to speech and/or sounds made by the corresponding rider 120.

In some embodiments, image data and/or audio data may be captured before the rider 120 enters the ride vehicle 124 and/or before the ride starts. For example, the rider 120 may enter a designated area, such as a photo booth, and any number of cameras may capture images and/or video of the rider 120. In certain embodiments, the cameras may be positioned and/or operated to capture images and/or video of the rider 120 at different angles, at different distances, with different lighting, and so forth. Additionally, or alternatively, the cameras may be operated to capture images of different portions (e.g., head, face, arm, hand, and so forth) of the rider 120. In some embodiments, an electronic display may provide instructions or prompt the rider 120 to pose in different ways, such as standing, sitting, walking, and so forth and the cameras may capture images and/or video of the different poses. The electronic display may also prompt the rider 120 to make different facial gestures, facial movements, or facial poses, such as smiling, frowning, raising eyebrows, yelling, shaking or nodding of the head, and so forth as the cameras capture images and/or video of the rider 120.

Any number of virtual reality devices 102 may receive image data corresponding to the captured images and/or video from the cameras in the designated area. For example, the automation controller 104 may receive the image data and may generate and/or update a virtual avatar based on the image data. For example, the automation controller 104 may analyze and/or process the image data to determine physical characteristics of the rider 120, such as a height, a hair color, an eye color, a position of facial features, and so forth. The automation controller 104 may generate and/or update the virtual avatar based on the determined physical characteristics. Additionally, or alternatively, the image data may be processed and/or analyzed remotely from the virtual reality device 102 and the automation controller 104 may receive processed image data and/or physical characteristics associated with any number of riders 120. In certain embodiments, the automation controller 104 may compare the image data to stored facial gesture profiles and may generate and/or update the virtual avatar based on a selected facial gesture profile. Each stored facial gesture profile may include a set of facial feature characteristics and a corresponding emotion and/or gesture. For example, the image data may be indicative of a rider smiling with upturned lips, teeth showing, and/or raised eyebrows. As such, the automation controller 104 may compare the facial features with the stored facial gesture profiles and may select the smiling facial gesture profile. Accordingly, the automation controller 104 may generate and/or update the virtual avatar to depict the virtual avatar smiling based on the selected facial gesture profile.

In certain embodiments, the virtual avatar may include a rigged model of a corresponding rider. As used herein, rigging refers to a technique for skeletal animation for representing a character model (e.g., a rigged model) using a series of interconnected digital features (e.g., bones). The rigged model may include movable features, such as facial features, a head, an arm, a hand, a finger, and so forth. The automation controller 104 may update the rigged model based on physical characteristics of the corresponding rider. Additionally or alternatively, the automation controller 104 may update an orientation, a facial gesture, a facial movement, a facial pose, and so forth based on image data captured by the image sensors 110 of physical (e.g., real or actual) orientation, facial gestures, facial movements, facial poses, and so forth of the corresponding rider. For example, a first rider with a first virtual reality device may turn their head to look towards a second rider with a second virtual reality device. The second virtual reality device may capture image data of the second rider and may process and/or transmit the image data to the first virtual reality device. Accordingly, the first virtual reality device may receive the image data corresponding to the second rider and may generate and/or update virtual reality image content to display to the first rider. For example, the first virtual reality device may generate and/or update a virtual avatar corresponding to the second rider.

Figure 2:
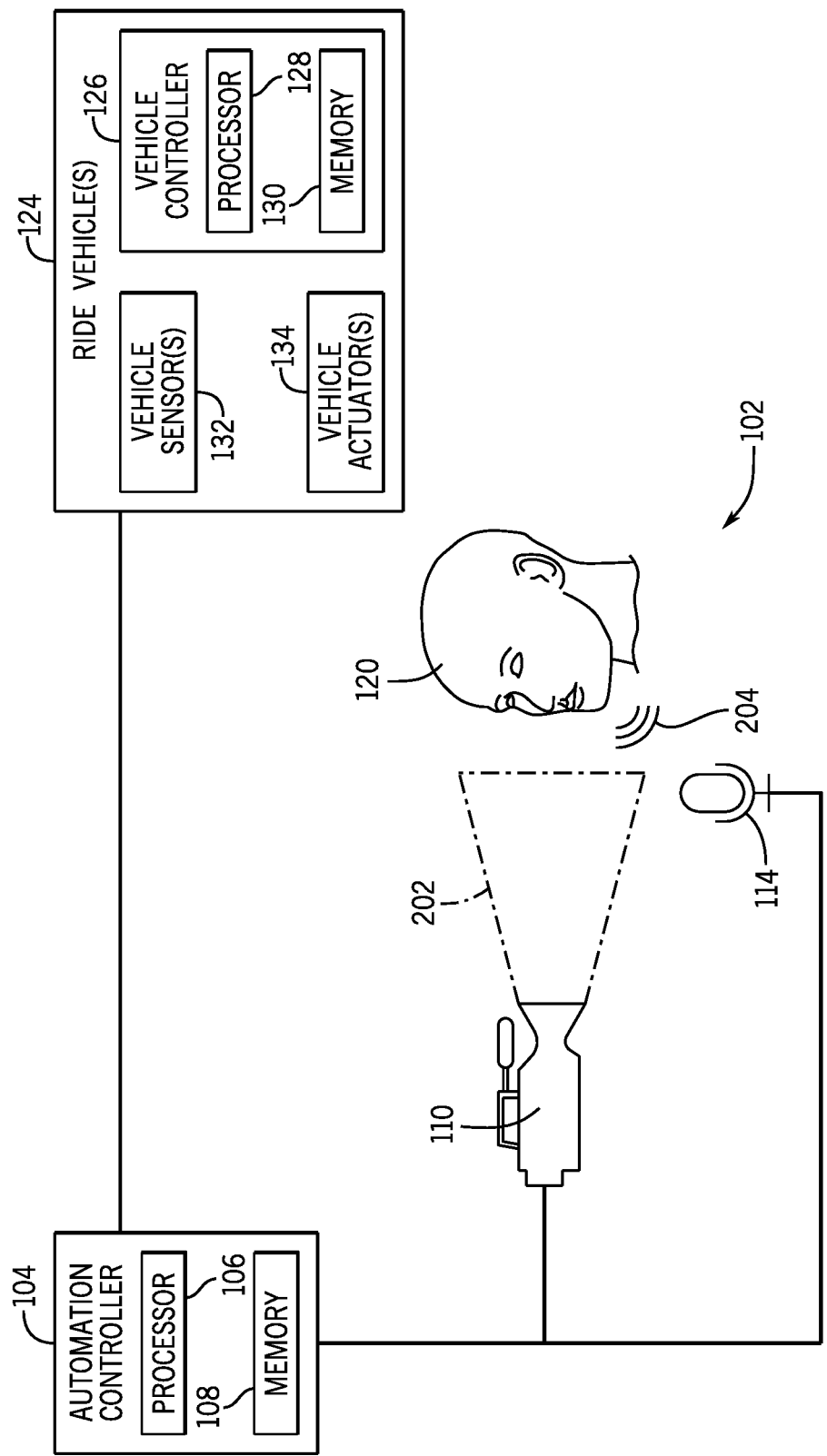
FIG. 2 is an example of the virtual reality device of FIG. 1, in accordance with an embodiment of the present disclosure.

With the foregoing in mind, FIG. 2 illustrates an example embodiment of the virtual reality device 102 in FIG. 1. The virtual reality device 102 may incorporate the image sensor 110 and the audio sensor 114. The image sensor 110 may capture any number of images and/or video of the rider 120.

For example, the image sensor 110 may capture images and/or video of the face, body, fingers, hands, and/or limbs of the rider 120. The image sensor 110 may capture a viewing area 202 selected by a controller, such as the automation controller 104. For example, the automation controller 104 may generate and transmit control signals to the image sensor 110 to capture the viewing area 202 based on movement detected by the image sensor 110. In certain embodiments, the viewing area 202 may include the face of the rider 120 and/or facial features (e.g., eyes, nose, mouth, and so forth) of the rider 120. The image sensor 110 may generate and/or transmit image data associated with the viewing area 202 to the automation controller 104 for processing. In certain embodiments, the automation controller 104 may determine physical characteristics (e.g., size, position, color, and so forth) associated with the rider 120 based on the image data. For example, the automation controller 104 may receive the image data and may determine contours, textures, and/or features of the rider's face. For example, the automation controller 104 may determine the position of the eyes on the rider's face, the color of the rider's hair, and so forth. Additionally, or alternatively, the automation controller 104 may generate virtual reality image content based on the image data. For example, the automation controller 104 may generate and/or update a virtual avatar based on the determined physical characteristics.

The audio sensor 114 may capture speech 204 and/or sounds made by the rider 120. The audio sensor 114 may generate audio data based on the captured speech 204 and/or sounds and may transmit the audio data to the automation controller 104. In certain embodiments, the automation controller 104 may receive the audio data and may determine text (e.g., words, phrases, sentences, and so forth) spoken by the rider 120. For example, the automation controller 104 may process the audio data using a natural language processing algorithm to generate text data. The automation controller 104 may generate virtual reality image content based on the audio data and/or the text data. For example, the automation controller 104 may generate and/or update a virtual avatar based on the audio data and/or the text data. The automation controller 104 may determine and/or generate phonemes based on the audio data and may determine and/or generate visemes based on the audio data and/or the phonemes. Additionally, or alternatively, the automation controller 104 may generate text associated with the captured speech 204 based on the audio data. For example, the automation controller 104 may use natural language processing to determine text associated with captured speech and may generate visemes based on the determined text. The automation controller 104 may transmit the audio data, the phonemes, the text, and/or the visemes to any number of additional virtual reality devices to generate and/or update virtual reality image content corresponding to the rider 120 based on the captured speech 204 of the rider 120.

Figure 3:
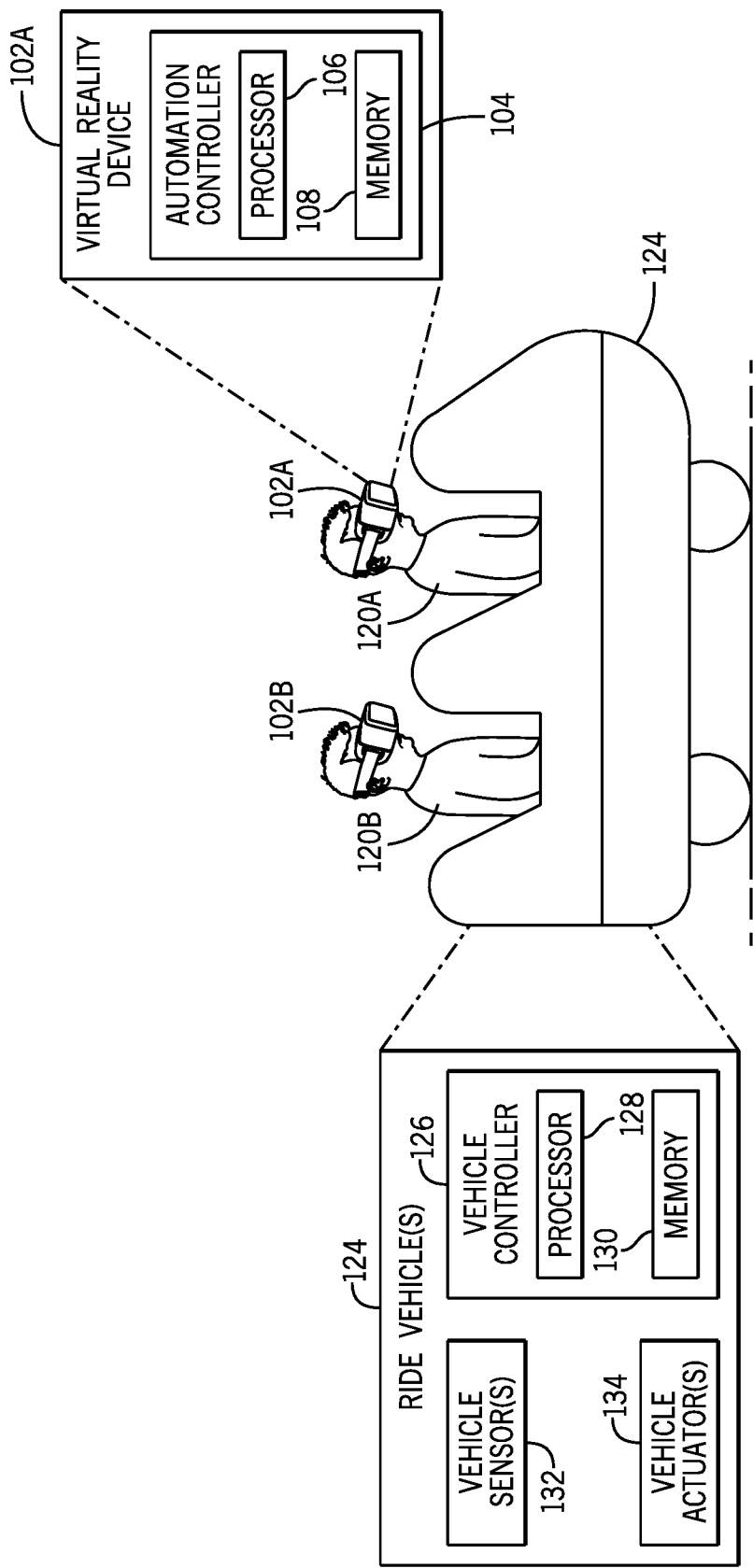
FIG. 3 is an example of multiple virtual reality devices of FIG. 1, in accordance with an embodiment of the present disclosure.

With the foregoing in mind, FIG. 3 illustrates an example embodiment of the virtual reality system 100 in FIG. 1 including a first virtual reality device 102A worn by a first rider 120A and a second virtual reality device 102B worn by a second rider 120B. The first virtual reality device 102A may capture sensor data, audio data, and/or image data associated with the first rider 120A, as described herein. In some embodiments, the first virtual reality device 102A may transmit the sensor data, the audio data, and/or the image data associated with the first rider 120A to the second virtual reality device 102B. The second virtual reality device 102B may receive the sensor data, the audio data, and/or the image data and may generate and/or update virtual reality image content to be displayed to the second rider 120B. For example, the first rider 120A may turn their head towards the second rider 120B. The second virtual reality device 102B may generate and/or update a virtual avatar corresponding to the first rider 120A based on the sensor data indicating the first rider 120A turning their head. As such, the second rider 120B may view the virtual avatar corresponding to the first rider 120A turning their head.

Additionally, or alternatively, the second virtual reality device 102B may generate and/or update the virtual reality image content based on image data captured by the first virtual reality device 102A. In certain embodiments, image sensors 110 in the first virtual reality device 102A may capture images indicative of facial movements, facial gestures, facial poses, and so forth made by the first rider 120A. In some embodiments, the first virtual reality device 102A may transmit the image data corresponding to the captured images to the second virtual reality device 102B. The second virtual reality device 102B may generate and/or update the virtual avatar corresponding to the first rider 120A based on the image data. For example, the first rider 120A may smile, blink, move their eyes, and so forth. As such, the second virtual reality device 102B may generate and/or update the virtual avatar corresponding to the first rider 120A based on the image data indicating facial movements of the first rider 120A. As such, the second rider 120B may view the virtual avatar corresponding to the first rider 120A blinking, smiling, moving their eyes, and so forth.

In some embodiments, the second virtual reality device 102B may generate and/or update the virtual reality image content based on audio data captured by the first virtual reality device 102A. For example, audio sensors 114 in the first virtual reality device 102A may capture audio indicative of speech made by the first rider 120A. In certain embodiments, the first virtual reality device 102A may transmit the audio data corresponding to the captured speech to the second virtual reality device 102B. The second virtual reality device 102B may generate and/or update the virtual avatar corresponding to the first rider 120A based on the audio data. For example, the second virtual reality device 102B may perform natural language processing on the audio data to determine text corresponding to the audio data. In some embodiments, the second virtual reality device 102B may generate a sequence of phonemes and/or a sequence of visemes based on the audio data, the determined text, or a combination thereof. As such, the second virtual reality device 102B may generate and/or update facial movements of the virtual avatar corresponding to the first rider 120A based on the sequence of visemes. Additionally, or alternatively, the second virtual reality device 102B may include one or more speakers to playback the audio data captured by the first virtual reality device 102A. Accordingly, the second virtual reality device 102B may display facial movements of the virtual avatar based on the audio data so the virtual avatar appears to be speaking during playback of the audio data. In the illustrated embodiment, the first virtual reality device 102A includes the automation controller 104, the processor 106, and the memory 108. Additionally, or alternatively, the first virtual reality device 102A may include any number of components, such as image sensors 110, display 112, audio sensors 114, speakers 116, antenna 118, and so forth. The second virtual reality device 102B may include the same components and/or similar components to the first virtual reality device 102A.

Figure 4:
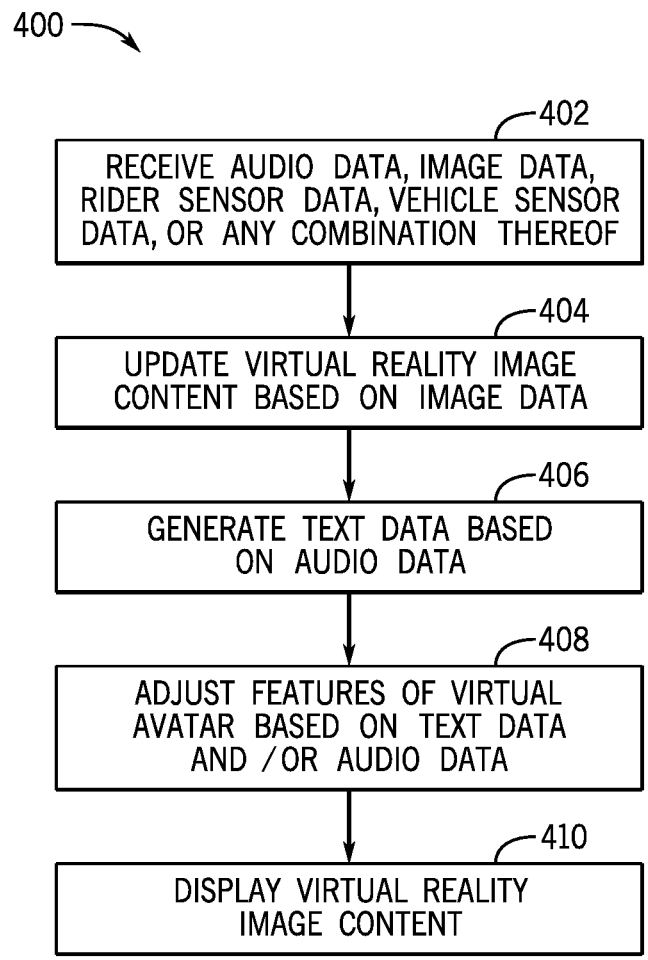
FIG. 4 is a flow diagram of an example process for operating the virtual reality ride system of FIG. 1, in accordance with an embodiment of the present disclosure.

With the foregoing in mind, FIG. 4 illustrates a flowchart of a process 400 for operating the virtual reality ride system 100 of FIG. 1, in accordance with an embodiment of the present disclosure. While the process is described as being performed by the automation controller 104, it should be understood that the process 400 may be performed by any suitable device, such as the processor 106, the vehicle controller 126, and so forth, that may control and/or communicate with components of a virtual reality ride system. Furthermore, while the process 400 is described using steps in a specific sequence, it should be understood that the present disclosure contemplates that the described steps may be performed in different sequences than the sequence illustrated, and certain described steps may be skipped or not performed altogether. In some embodiments, the process 400 may be implemented by executing instructions stored in a tangible, non-transitory, computer-readable medium, such as the memory 108, using any suitable processing circuitry, such as the processor 106.

In the process 400, a virtual reality device, such as virtual reality device 102 in FIG. 1 may receive audio data, image data, rider sensor data, vehicle sensor data, or any combination thereof. For example, at block 402, the automation controller 104 may receive audio data captured by one or more audio sensors 114 of a separate virtual reality device, image data captured by one or more image sensors 110 of the separate virtual reality device, rider sensor data captured by one or more rider sensors, and/or vehicle sensor data captured by one or more vehicle sensors 132. Additionally, or alternatively, the virtual reality device 102 may receive environment sensor data associated with a ride environment.

At block 404, the automation controller 104 may generate and/or update virtual reality image content based on the image data. For example, the automation controller 104 may determine physical characteristics (e.g., hair color, facial movements, facial gestures, and so forth) of another rider of the virtual reality ride system 100 and may update and/or animate a virtual avatar corresponding to the other rider. Additionally, or alternatively, the automation controller 104 may generate and/or update facial features of the virtual avatar based on the image data. For example, the automation controller 104 may generate and/or update a position and/or a size of facial features (e.g., mouth, nose, eyes, and so forth) based on the image data.

At block 406, the automation controller may generate text data based on the audio data. For example, the automation controller 104 may perform a natural language processing algorithm to determine text associated with captured speech for another rider of the virtual reality ride system. In certain embodiments, the automation controller 104 may determine a sequence of phonemes and/or a sequence of visemes associated with the captured speech. Additionally, or alternatively, the automation controller 104 may process the audio data. For example, the automation controller 104 may filter the audio data to remove background noise, may enhance an audio characteristic (e.g., volume) of the audio data, may alter a voice characteristic (e.g., pitch, tone, timbre, and so forth) associated with the captured speech, and so forth. In some embodiments, the automation controller 104 may generate new audio data and/or update the audio data based on a theme of the virtual reality ride system 100. For example, the virtual reality ride system 100 may include an electronics or robotics theme and the automation controller 104 may generate new audio data and/or alter the audio data to produce a more robotic sounding speech based on the captured speech.

At block 408, the automation controller 104 may generate and/or update the virtual reality image content based on the text data and/or the audio data. In some embodiments, the automation controller 104 may adjust facial features of the virtual avatar based on the text data and/or the audio data. For example, the automation controller 104 may adjust and/or animate the facial features of the virtual avatar based on the sequence of visemes. Accordingly, the virtual reality image content may depict movement of the facial features of the virtual avatar corresponding to the captured speech.

At block 410, the virtual reality device 102 may display the virtual reality image content including the virtual avatar. In certain embodiments, the automation controller 104 may instruct the display 112 to display the virtual reality image content and/or may instruct one or more speakers to playback the audio data. As such, the rider of the virtual reality ride system 100 may hear playback of the captured speech and may view facial movements of the virtual avatar corresponding to the captured speech to provide a more realistic and/or immersive experience.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A virtual reality ride system, comprising:
    a first virtual reality device comprising:
        a first display configured to present virtual reality image content to a first rider;
        an audio sensor configured to capture audio data associated with the first rider;
        an image sensor configured to capture image data associated with the first rider; and
        at least one processor, the at least one processor configured to:
            receive the audio data, the image data, or both;
            generate a virtual avatar corresponding to the first rider, wherein the virtual avatar comprises a set of facial features;
            animate the set of facial features based on the audio data, the image data, or both; and
            transmit the virtual avatar and the animated set of facial features to a second virtual reality device; and
    the second virtual reality device comprising a second display configured to present the virtual avatar and the animated set of facial features to a second rider.

2. The virtual reality ride system of claim 1, wherein the at least one processor is configured to:
    generate a facial gesture based on the image data as part of the animated set of facial features.

3. The virtual reality ride system of claim 1, wherein the at least one processor is configured to:
    determine a sequence of visemes based on the audio data; and
    animate the set of facial features based on the visemes.

4. The virtual reality ride system of claim 1, comprising a ride vehicle sensor configured to capture vehicle sensor data indicative of movement characteristics of a ride vehicle.

5. The virtual reality ride system of claim 4, wherein the at least one processor is configured to:
receive the vehicle sensor data;
determine a predicted movement profile associated with the ride vehicle; and
alter the virtual avatar based on the predicted movement profile.

6. The virtual reality ride system of claim 5, wherein altering the virtual avatar based on the predicted movement profile comprises altering the set of facial features based on the predicted movement profile.

7. The virtual reality ride system of claim 1, comprising a rider sensor configured to capture sensor data indicative of a set of movement characteristics associated with the second rider.

8. The virtual reality ride system of claim 7, wherein the set of movement characteristics comprises an orientation of the second rider, a position of the second rider, a speed of the second rider, an acceleration of the second rider, or any combination thereof.

9. The virtual reality ride system of claim 7, wherein the at least one processor is configured to:
receive the sensor data; and
update the virtual avatar based on the sensor data.

10. The virtual reality ride system of claim 9, wherein the at least one processor is configured to:
alter a pose of the virtual avatar based on the sensor data;
alter the set of facial features based on the sensor data; and
transmit the virtual avatar and the altered set of facial features to the second virtual reality device, wherein the second display is configured to present the virtual avatar and the altered set of facial features to the second rider.

11. The virtual reality ride system of claim 9, wherein the at least one processor is configured to alter a pose of the virtual avatar based on the sensor data.

12. The virtual reality ride system of claim 11, wherein the at least one processor is configured to transmit the virtual avatar after being altered into the pose to the second virtual reality device, wherein the second display is configured to present the virtual avatar in the pose.

13. The virtual reality ride system of claim 9, wherein the at least one processor is configured to alter the set of facial features based on the sensor data.

14. The virtual reality ride system of claim 13, wherein the at least one processor is configured to transmit the altered set of facial features to the second virtual reality device, wherein the second display is configured to present the altered set of facial features to the second rider.

15. A virtual reality device, comprising:
an audio sensor configured to capture audio data indicative of speech of a user;
an image sensor configured to capture image data indicative of facial characteristics of the user; and
at least one processor communicatively coupled to the audio sensor, and the image sensor, wherein the at least one processor is configured to:
determine a set of facial characteristics based on the image data;
determine a set of facial movements associated with the set of facial characteristics based on the audio data; and
transmit the set of facial characteristics and the set of facial movements to a second virtual reality device, the second virtual reality device configured to display virtual reality image content based on the set of facial characteristics and the set of facial movements.

16. The virtual reality device of claim 15, comprising:
a display configured to display virtual reality image content to the user;
wherein the at least one processor is configured to:
receive, from the second virtual reality device, second audio data, second image data, or both;
generate a model of a second user based on the second image data;
animate the model based on the second audio data; and
instruct the display to present the virtual reality image content including the animated model.

17. The virtual reality device of claim 16, comprising an audio playback device configured to playback the second audio data.

18. The virtual reality device of claim 16, wherein the at least one processor is configured to:
receive user sensor data associated with the second user; and
animate the model based on the user sensor data.

19. The virtual reality device of claim 16, wherein the at least one processor is configured to:
receive vehicle sensor data associated with a ride vehicle; and
animate the model based on the vehicle sensor data.

20. The virtual reality device of claim 16, wherein the at least one processor is configured to:
determine text data associated with the second audio data;
determine a set of visemes associated with the text data; and
animate the model based on the set of visemes.

21. The virtual reality device of claim 16, wherein the second audio data corresponds to speech of the second user.

22. The virtual reality device of claim 21, wherein the at least one processor is configured to alter a set of facial features of the model based on the speech.

23. A method, comprising:
receiving audio data, image data, or both;
generating a virtual avatar based on the image data, wherein the virtual avatar comprises a set of facial features;
determining a set of facial characteristics associated with the image data;
comparing the set of facial characteristics with a set of facial gesture profiles, each facial gesture profile of the set of facial gesture profiles comprising a corresponding set of stored facial characteristics;
selecting, based on the comparison, a facial gesture profile of the set of facial gesture profiles;
animating the set of facial features based on the selected facial gesture profile, the audio data, or both; and
presenting virtual reality image content comprising the virtual avatar and the animated set of facial features.

24. The method of claim 23, comprising:
receiving a set of vehicle sensor data indicative of a movement profile associated with a vehicle; and
animating the virtual avatar based on the movement profile.

* * * * *